United States Patent
Lee (10) Patent No.: US 7,471,679 B2
(45) Date of Patent: Dec. 30, 2008

(54) METHOD AND APPARATUS FOR RECEIVABILITY AND REACHABILITY TEST OF EXPLICIT MULTICAST

(75) Inventor: Ji-Woong Lee, Seoul (KR)

(73) Assignee: KTFREETEL Co., Ltd., Seoul (KR)

(*) Notice: Subject to any disclaimer, the term of this patent is extended or adjusted under 35 U.S.C. 154(b) by 751 days.

(21) Appl. No.: 11/046,100

(22) Filed: Jan. 28, 2005

(65) Prior Publication Data

US 2006/0171322 A1 Aug. 3, 2006

Related U.S. Application Data

(63) Continuation of application No. PCT/KR02/01448, filed on Jul. 31, 2002.

(51) Int. Cl.
*H04L 12/28* (2006.01)
(52) U.S. Cl. .................... 370/390; 370/244
(58) Field of Classification Search ............. 370/390, 370/244
See application file for complete search history.

(56) References Cited

U.S. PATENT DOCUMENTS

| 6,195,751 | B1 | 2/2001 | Caronni et al. |
| 6,330,236 | B1 | 12/2001 | Ofek et al. |
| 6,625,773 | B1* | 9/2003 | Boivie et al. ............ 714/749 |
| 2002/0145981 | A1* | 10/2002 | Klinker et al. ........... 370/244 |

FOREIGN PATENT DOCUMENTS

KR 1998-025598 7/1998

OTHER PUBLICATIONS

J. Postel, "Internet Control Message Protocol", Network Working Group Request for Comments 792, Sep. 1981, pp. 1-7.*

* cited by examiner

*Primary Examiner*—Wing F Chan
*Assistant Examiner*—Matthew Campbell
(74) *Attorney, Agent, or Firm*—Knobbe Martens Olson & Bear LLP (57) ABSTRACT

The present invention relates to method and apparatus for receivability test and reachability test of explicit multicast packet. In one embodiment, the xcast receivability test comprises i) at a sender end, sending a receivability probe packet to a receiver end, ii) at the receiver end, receiving the receivability probe packet, iii) generating an ICMP error message-Destination Unreachable, iv) sending the ICMP error message-Destination Unreachable to sender end, v) at the sender end, receiving the ICMP error message-Destination Unreachable and vi) analyzing the ICMP error message-Destination Unreachable.

14 Claims, 7 Drawing Sheets

When TTL=1

FIG.5A

When TTL=2

FIG.5B

When TTL=2

FIG.6A

When TTL=3

FIG.6B

When TTL=3

FIG.7A

When TTL=4

FIG.7B

When TTL=4

METHOD AND APPARATUS FOR RECEIVABILITY AND REACHABILITY TEST OF EXPLICIT MULTICAST

RELATED APPLICATIONS

This application is a continuation application, and claims the benefit under 35 U.S.C. §§ 120 and 365 of PCT Application No. PCT/KR2002/001448, filed on Jul. 31, 2002 and published Feb. 5, 2004, in English, which is hereby incorporated by reference.

BACKGROUND OF INVENTION

1. Field of the Invention

The present invention relates to a method and apparatus for receivability test and reachability test of an explicit multicast packet and more particularly, to a method and apparatus for receivability test and reachability test by using an explicit multicast packet having at least one destination in order to effectively secure the communication between a sender node and a receiver node.

2. Description of the Related Technology

Generally, the receivability test on a network is a test to determine whether a receiver node can obtain function embodiments provided by a packet or protocol composed of a specific network protocol as a sender node intended.

The prior protocols requiring the receivability test inherently have their processes for negotiating embodiment functions of protocols. The process selects functions to be used and functions not to be used during communication before flowing user traffic between end-to-end through the embodiment function negotiation.

Generally, the reachability test on a network is a test to be determined whether a packet composed of a specific network protocol can reach to the intended receiver end through the conventional routing.

There is not needed an additional reachability test on the conventional network. The determination of reachability depends on the normal operation of the routing protocol. The routing protocol tests the reachability of network by use of HELLO packet with which a sender end and receiver node confirm the presence and state of each other.

Signal packet in a general concept is a packet used for negotiating the communication condition before the user traffic generated at the sender end reaches the receiver end, or for exchanging information by use of HELLO packet of the network routing protocol. But, the explicit multicast(hereinafter referred to as 'xcast') does not provide signal packet intentionally.

It is because the xcast routing itself has an inclination toward a unicast routing. Also, to exchange signal packet between the sender end and the receiver end implies that network maintains the record of communication state. Thus, to maintain the communication state between the sender end and the receiver itself can cause network load.

Here, the xcast that does not adopt signal packet is designed to maintain a simple structure, so development and arrangement can be easily achieved.

But, since the xcast does not provide signal packet, it loses a possibility of useful tests for confirm the network states such as receivability test and reachability test. Until now no methods for receivability test and reachability test of xcast are provided. Thus, there is no way for the sender end and the receiver end to perform a stable xcast communication.

SUMMARY OF CERTAIN INVENTIVE ASPECTS OF THE INVENTION

One aspect of the present invention provides a method and apparatus for xcast packet receivability test and xcast packet reachability test of hosts on the xcast network without adding any new signal packet to the xcast.

Another aspect of the present invention provides a method and apparatus for xcast packet reachability test by use of Internet Control Message Protocol(ICMP) error message-Time exceeded.

Another aspect of the present invention provides a method and apparatus for receivability test comprising the steps of: at the sender node, generating and sending a receivability probe packet to the receiver end; at the receiver end, receiving the receivability probe packet; generating an ICMP error message-Destination Unreachable corresponding to the receivability probe packet by the receiver end; sending ICMP error message-Destination Unreachable to the sender end; at the sender end, receiving the ICMP error message-Destination Unreachable; and at the sender end, determining the explicit multicast receivability by analyzing ICMP error message-Destination Unreachable.

Another aspect of the present invention provides a method and apparatus for reachability test comprising the steps of: generating and sending a reachability probe packet with a Time-to Live(TTL) value to the receiver end; at router, receiving the reachability probe packet; sending ICMP error message-Time exceeded to the sender end after analyzing the reachability probe packet; sending a reachability probe packet with a TTL value that is increased by 1 to the receiver end on receiving an ICMP error message-Time exceeded; at the receiver end, receiving the reachability probe packet; generating an ICMP error message-Destination Unreachable corresponding to the reachability probe packet; sending the ICMP error message-Destination Unreachable to the sender end; at receiver end, receiving the ICMP Destination Unreachable message; and determining the each transit node's reachability by analyzing the ICMP error messages.

DETAILED DESCRIPTION OF CERTAIN EMBODIMENTS OF THE INVENTION

Hereinafter, embodiments of the present invention will be described with accompanying drawings.

Figure 1:
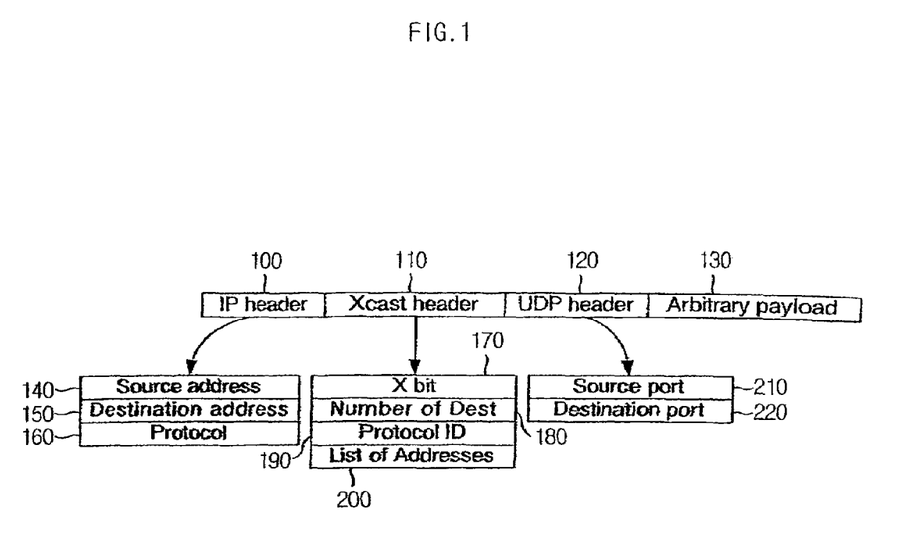
FIG. 1 is a block diagram of the receivability probe packet.

FIG. 1 is a block diagram of the receivability probe packet according to one embodiment of the present invention.

Referring to FIG. 1, the receivability probe packet comprises an IP header 100, an xcast header 110, an UDP header 120 and an arbitrary payload 130. The IP header 100 comprises a Source address field 140 that is assigned to the sender end, a Destination address field 150 that is assigned to the receiver end and a Protocol field 160. Also, the explicit multicast header 110 comprises an X bit field 170, a List of Addresses field 200, a Number of Destination field 180 and a Protocol ID field 190. And, the UDP header 120 comprises a Source port field 210 and a Destination port field 220.

Figure 2:
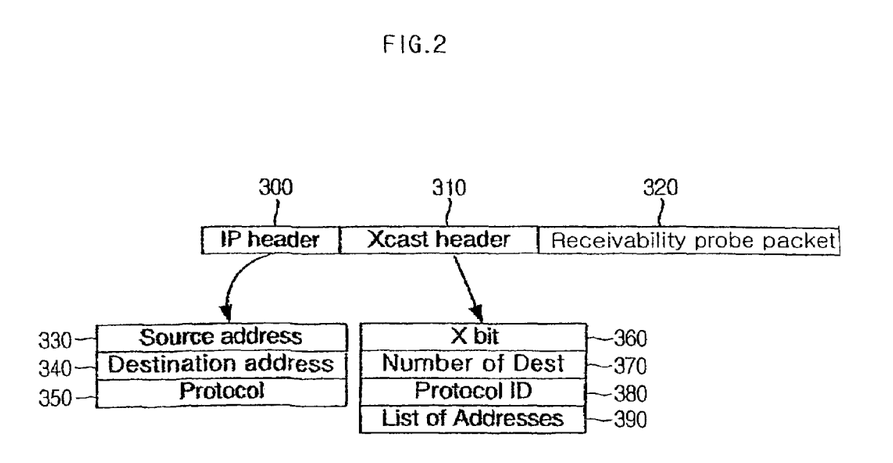
FIG. 2 is a block diagram of the reachability probe packet.

FIG. 2 is a block diagram of the reachability probe packet according to one embodiment of the present invention.

Referring to FIG. 2, the reachability probe packet comprises a tunnel IP header 300, a tunnel explicit multicast header 310 and a receivability probe packet 320. 032 The tunnel IP header 300 comprises a Source address field 330 that is assigned to the sender end, a Destination address field 340 that is assigned to the receiver end and a Protocol field 350. Also, the tunnel explicit multicast header 310 comprises X bit field 360, a List of Addresses field 390, a Number of Destination field 370 and a Protocol ID field 380.

Figure 3:
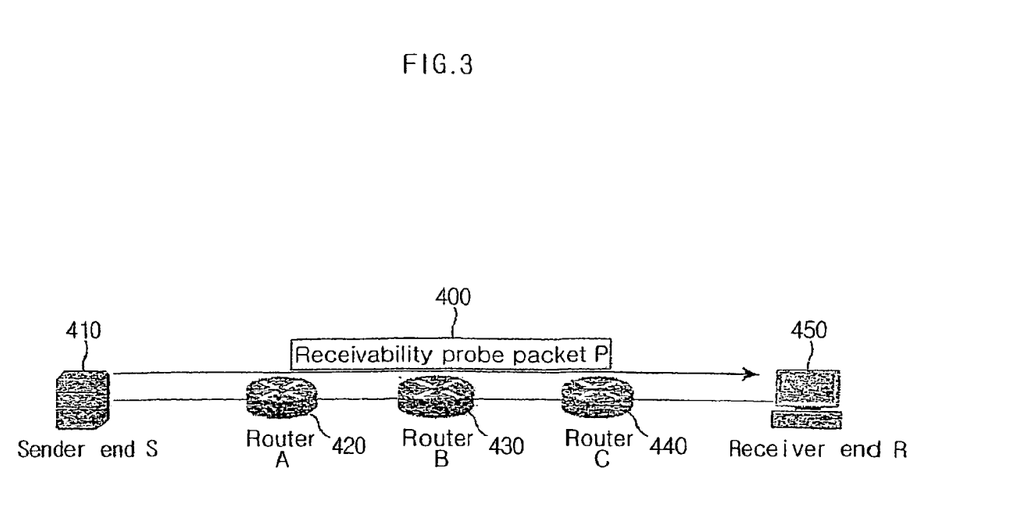
FIG. 3 illustrates the xcast receivability test.

FIG. 3 illustrates the xcast receivability test according to one embodiment of the present invention.

Referring to FIG. 3, a sender end S 410 sends a receivability probe packet P 400 in order to confirm xcast receivability of a receiver end R 450. As the receivability probe packet P 400 is a packet having the unicast address of receiver end R 450 as a destination address, the receivability probe packet P 400 reaches the receiver end R 450 through normal unicasting at the ordinary routers A 420, B 430 and C 440.

If the receiver end R 450 can recognize xcast to receive the receivability probe packet P 400, then the receiver end R 450 passes the receivability probe packet P 400 to xcast processing module. The xcast processing module passes the packet to UDP processing module. On receiving the packet, the UDP processing module recognizes that the value in the Protocol ID of the UDP header of the receivability probe packet P 400 is not a registered value. And, the UDP processing module sends ICMP(Internet Control Message Protocol) error message-Destination Unreachable or Port Unreachable to the sender end S 410.

On receiving Port Unreachable error message from the receiver end R 450, the sender end S 410 recognizes that the receiver end R 450 has xcast ability. Thus, the xcast receivability test of the sender end S 410 for the receiver end R 450 is successfully accomplished.

If the receiver end R 450 cannot recognize xcast or receive xcast packet, then the receiver end R 450 cannot determine to where the xcast packet to be passed. Thus, the receiver end R 450 sends ICMP error message-Protocol Unreachable to the sender end S 410. On receiving the Protocol Unreachable error message, the sender end S 410 recognizes that there is no processing module that can handle xcast packet in the receiver end S 450. Thus, through the xcast receivability test of sender end S 410 for the receiver end R 450, it is confirmed that the receiver end R 450 does not have xcast receivability.

Figure 4:
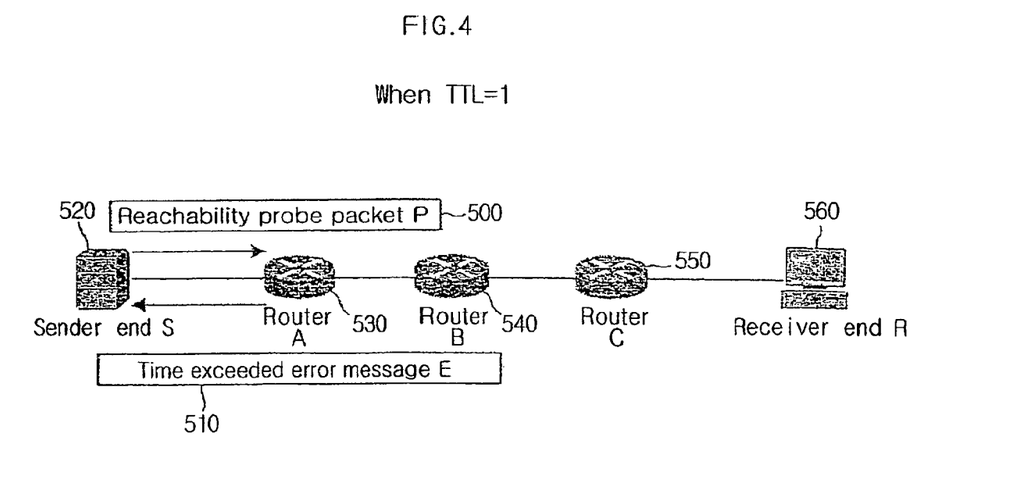
FIG. 4 shows the first step of the xcast reachability test.

FIG. 4 shows the first step of the xcast reachability test according to one embodiment of the present invention.

Referring to FIG. 4, the sender end S 520 sends the reachability probe packet P 500 to the receiver end R 560 in order to test the xcast reachability. The reachability probe packet P 500 has a link local multicast address, which is specially assigned for xcast, as a destination address. Also, because TTL(Time-to-Live) value in the tunnel IP header of the reachability probe packet P 500 is set in proportion to the number of generation of probe packet, the validity of TTL value is checked every time the probe packet passes through each router, transit node.

FIG. 4 shows the first step of xcast reachability test. In the test, because the TTL value is set to 1 and the destination of IP header is not router A 530, router A 530 sends ICMP error message-Time exceeded, TTL exceeded in transit E 510 to sender end 520. On receiving E 510, the sender end S520 recognizes that the first transit node on the delivery path to the receiver end R 560 is the router A 530.

Figure 5A:
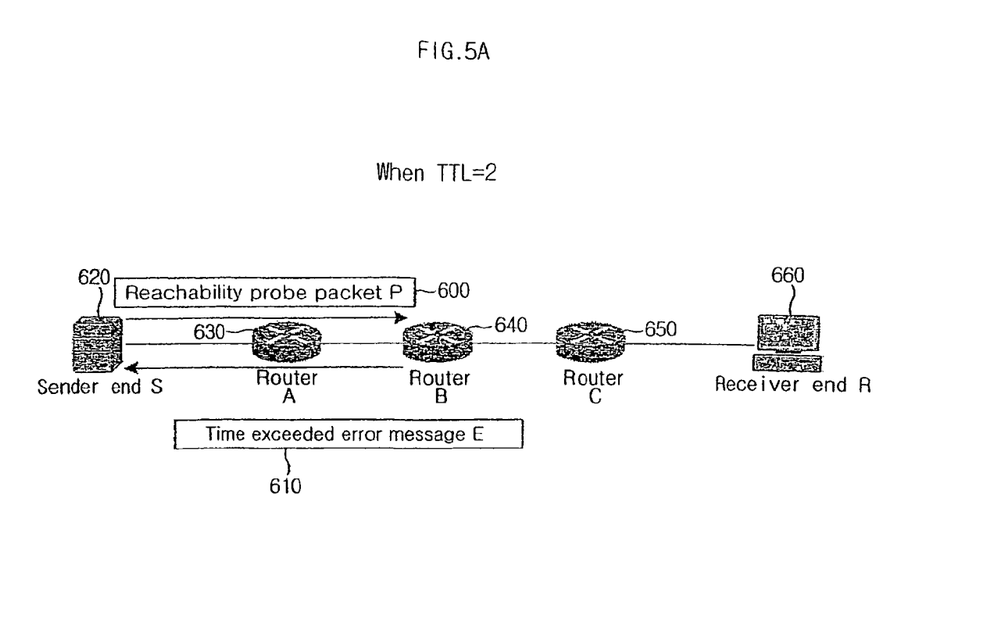
FIG. 5*a* shows the second step of the xcast reachability test.
Figure 5B:
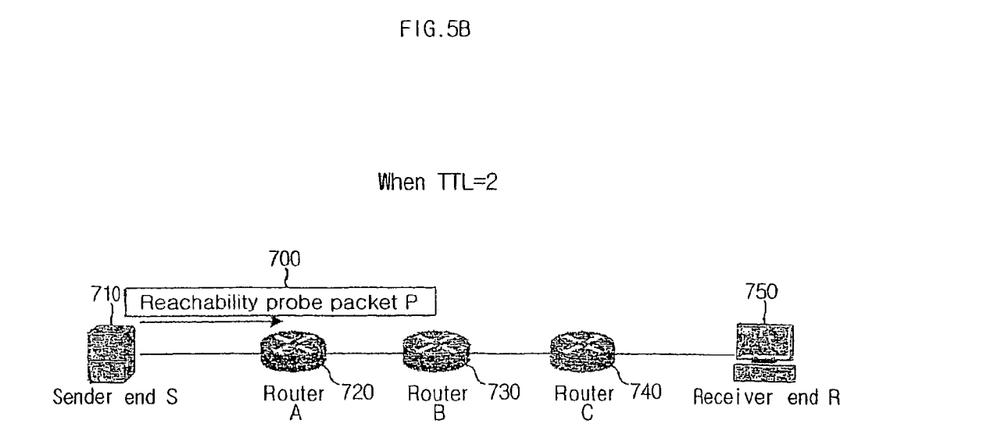
FIG. 5*b* shows the result that may occur at the third step of the xcast reachability test.

FIG. 5a and FIG. 5b show the second step of the xcast reachability test according to one embodiment of the present invention.

Referring to FIG. 5a, it is assumed that the router A 630 has an xcast routing ability. Since TTL value of the reachability probe packet P 600 is initially set to 2, the reachability probe packet P 600 is routed at the router A 630 and reaches router B 640, and, as shown in FIG. 5a, TTL exceeded in transit E 610 is sent to the sender end S 620. On receiving E 610, the sender end S 620 recognizes that the second transit node of multicast packet is the router B 640. Also, at the same time, the sender end S 620 recognizes that the first transit node A 630 has xcast routing ability.

Referring to FIG. 5b, if the router A 720 is incapable of the xcast routing, since the reachability probe packet P 700 has the link local multicast address as a destination address, the router A 720 discards P 700 without generating any error message. So, it passed about 1 to 60 seconds from when reachability probe packet P 700 was sent, however, the sender end S 710 will not receive any error message. Thus, the sender end S 710 regards that the router A 720 is incapable of xcast routing and does not perform reachability test any more.

Figure 6A:
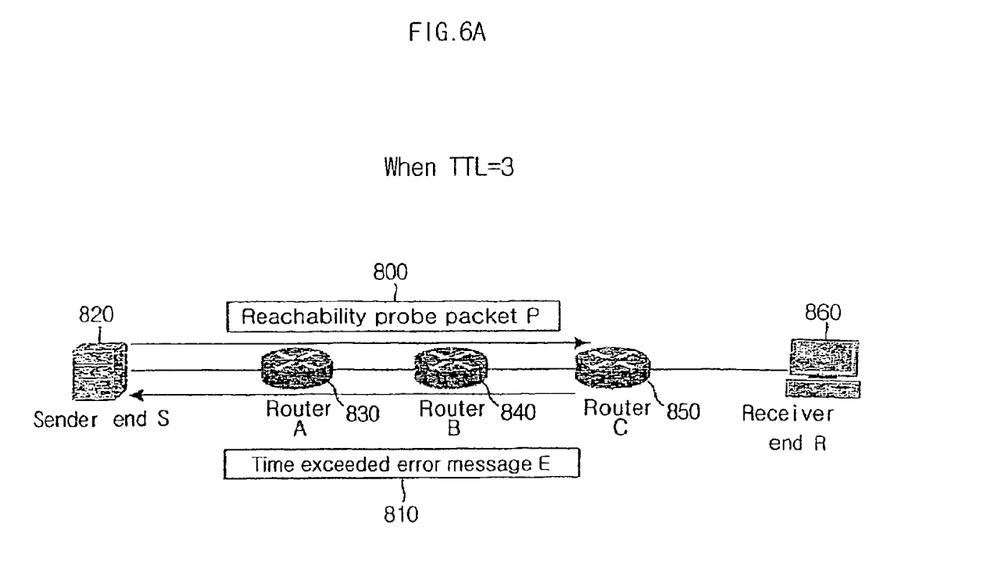
FIG. 6*a* shows the third step of the xcast reachability test.
Figure 6B:
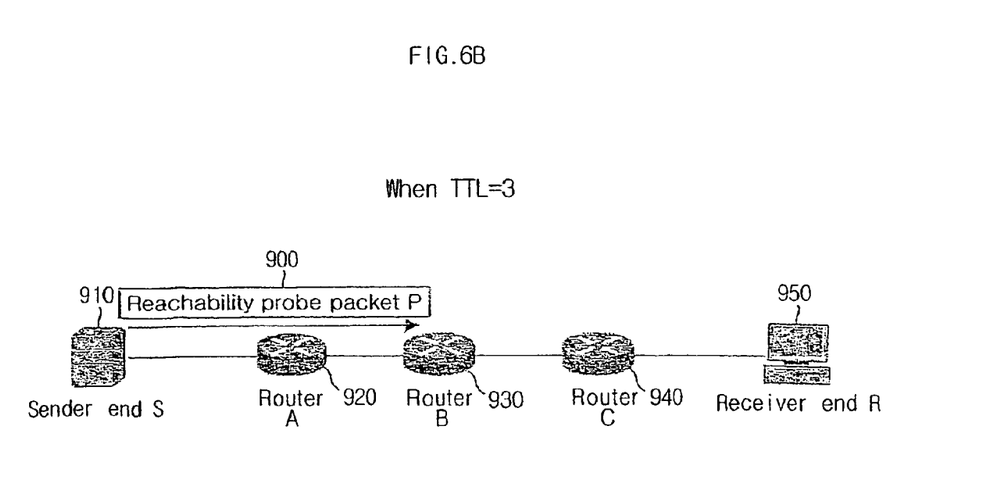
FIG. 6*b* shows the result that may occur at the third step of the xcast reachability test.

FIG. 6a and FIG. 6b show the third step of the xcast reachability test according to one embodiment of the present invention.

Referring to FIG. 6a, it is assumed that the router B 840 has xcast routing ability. Since TTL of the reachability probe packet P 800 is initially set to 3, the reachability probe packet P 800 is routed by the router A 830 and the router B 840 to reach the router C 850, and as shown in FIG. 5a, TTL exceeded in transit B 810 is sent to the sender end S 820. On receiving E 810, the sender end S 820 recognizes that the third transit node of multicast packet is the router C 850. Also, at the same time, the sender end S 820 recognizes that the first transit node B 840 has xcast routing ability.

Referring to FIG. 6b, if the router B 930 is incapable of xcast routing, since the reachability probe packet P 900 has the link local multicast address as a destination address, the router B 930 discards P 900 without generating any error message. So, it passed about 1 to 60 seconds from when reachability probe packet P 900 was sent, however, the sender end S 910 will not receive any error message. Thus, the sender end S 910 recognizes that the router B 930 is incapable of xcast routing. At this time, the sender end S 910 regards that it fails in the xcast reachability test for the router B 930 and does not perform reachability test any more.

Figure 7A:
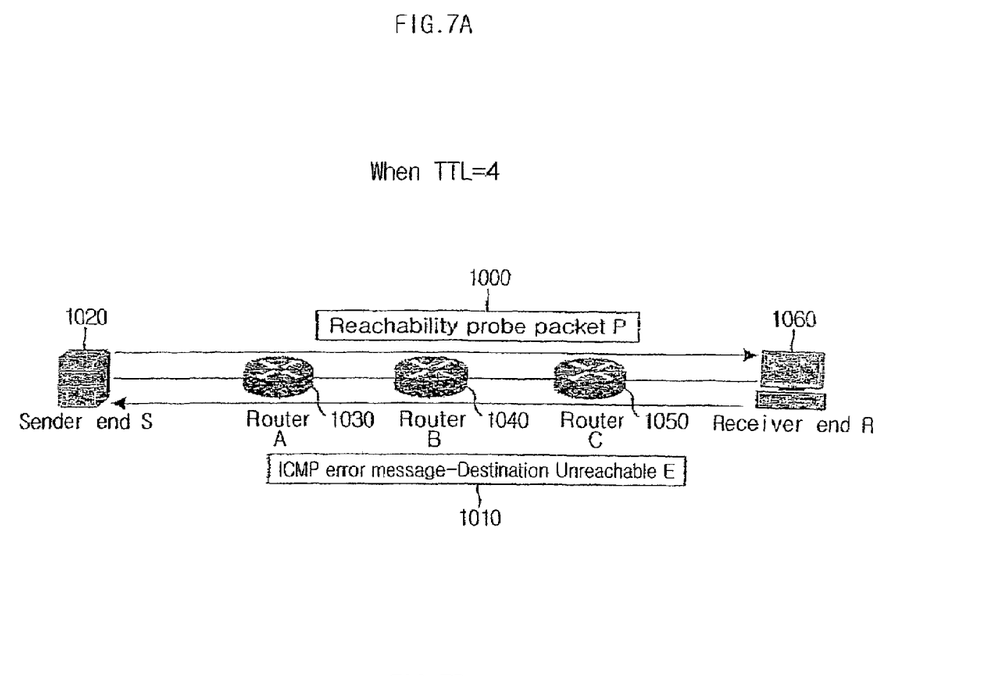
FIG. 7*a* shows the fourth step of the xcast reachability test.
Figure 7B:
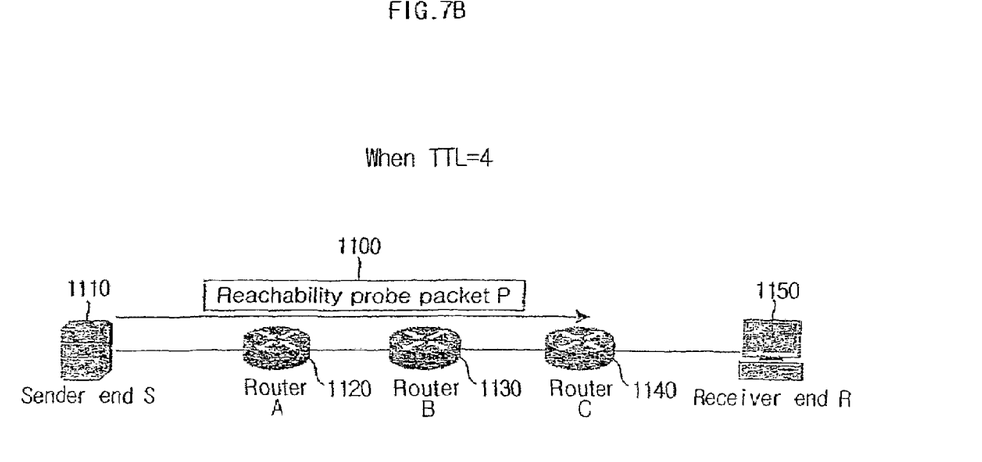
FIG. 7*b* shows the result that may occur at the fourth step of the xcast reachability test.

FIG. 7a and FIG. 7b show the fourth step of the xcast reachability test according to one embodiment of the present invention.

Referring to FIG. 7a, it is assumed that the router C 1050 has xcast routing ability. Since TTL of the reachability probe packet P 1000 is initially set to 4, the reachability probe packet P 800 is routed by the router A 1030, the router B 1040 and the router C 1050 to reach the receiver end R 1060. The receiver end R 1060 sends, as shown in FIG. 7a, TTL exceeded E' 1010 to the sender end S 1020. On receiving E' 1010, the sender end S 1020 recognizes that the fourth node of multicast packet is the receiver end R 1060. Also, at the same time, the sender end S 1020 recognizes that the third transit node C 1050 has xcast routing ability.

Referring to FIG. 7b, if the router C 1140 is incapable of xcast routing, since the reachability probe packet P 1100 has the link local multicast address as a destination address, the router C 1140 discards P 1100 without generating any error message. So, it passed about 1 to 60 seconds from when reachability probe packet P 1100 was sent, however, the sender end S 1110 will not receive any error message. Thus, the sender end S 1110 recognizes that the router C 1140 is incapable of xcast routing. At this time, the sender end S 1110 regards that it fails in the xcast reachability test for the router C 1140 and does not perform reachability test any more.

Figure 8:
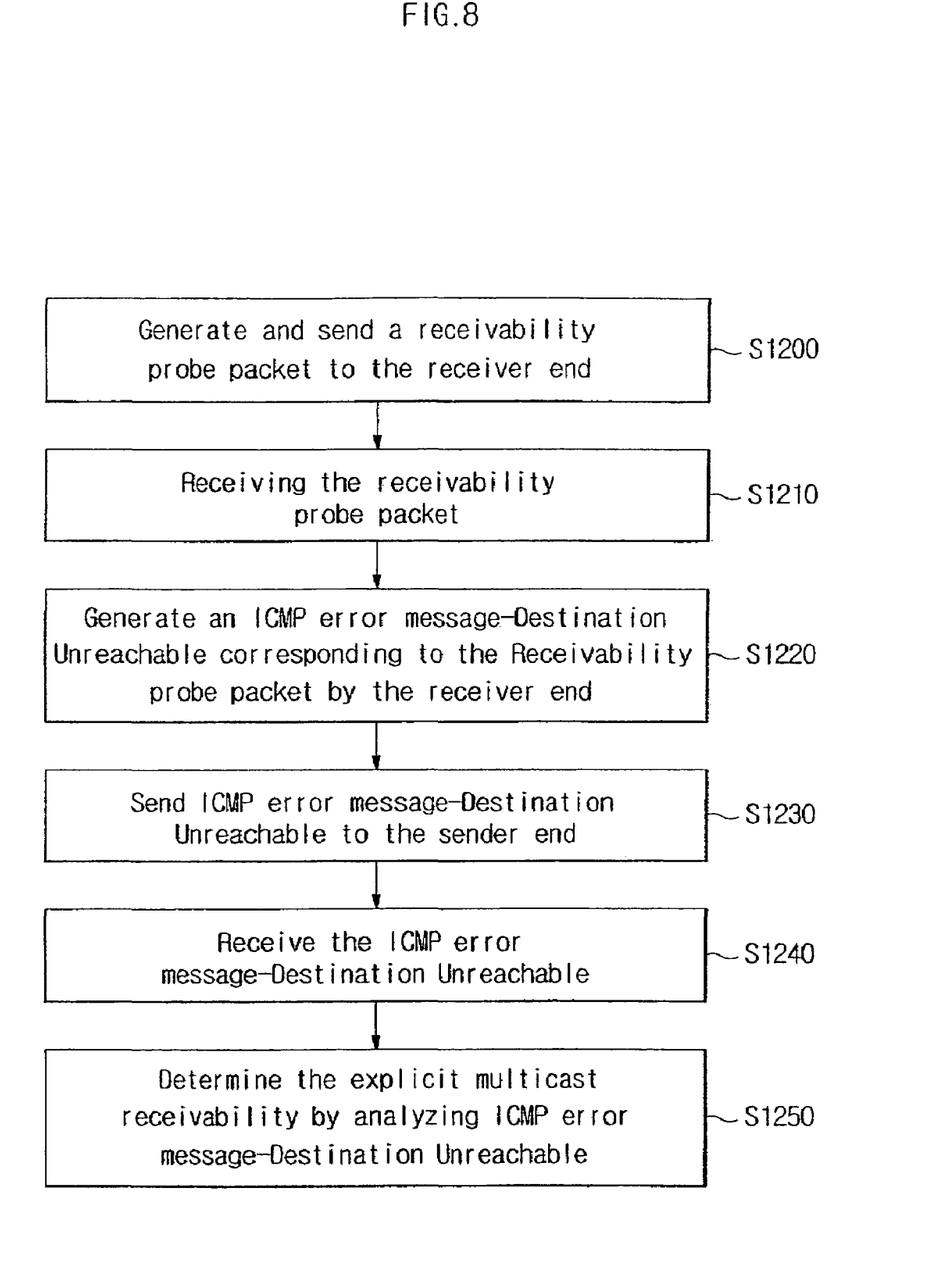
FIG. 8 is a flow chart of the receivability test.

FIG. 8 is a flow chart of the receivability test. Referring to FIG. 8, a method of receivability test of explicit multicast of a receiver end will be described. The sender end generates and sends a receivability probe packet to the receiver end (S1200). The receiver end receives the receivability probe packet (S1210). The receiver end generates an internet control message protocol (ICMP) error message-Destination Unreachable corresponding to the receivability probe packet (S1220). The receiver end sends the ICMP error message-Destination Unreachable to the sender end (S1230). The sender end receives the ICMP error message-Destination Unreachable (S1240). The sender end determines the explicit multicast receivability by analyzing the ICMP error message-Destination Unreachable (S1250).

Figure 9:
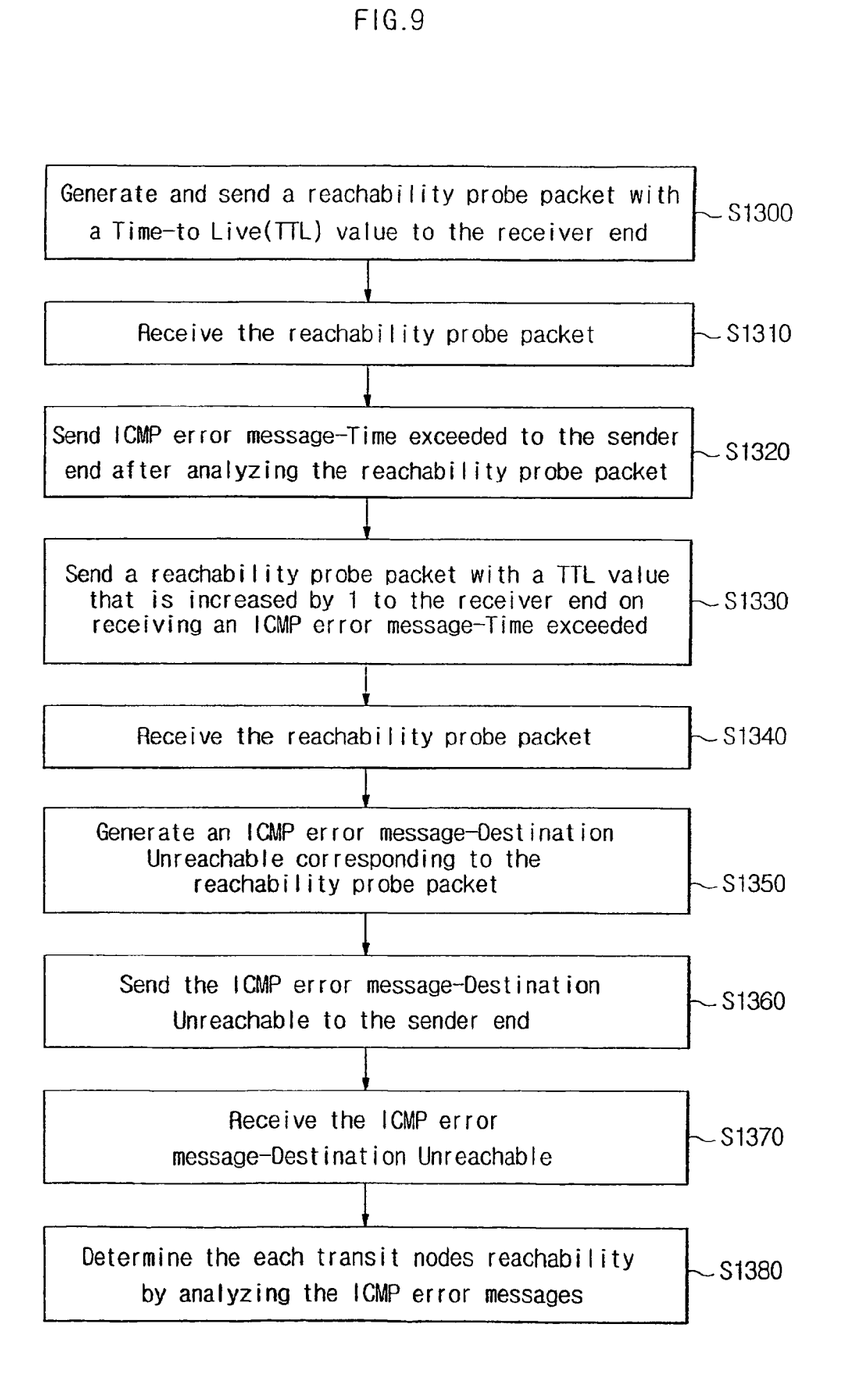
FIG. 9 is a flowchart of the reachability test.

FIG. 9 is a flowchart of the reachability test. Referring to FIG. 9, a method of reachability test of explicit multicast of a receiver end will be described. The sender end generates and sends a reachability probe packet with a time-to-live (TTL) value to the receiver end (S1300). The receiver end receives the reachability probe packet (S1310). The receiver end sends an ICMP error message-Time exceeded to the sender end after analyzing the reachability probe packet (S1320). The sender end sends a reachability probe packet with a TTL value that is increased by 1 to the receiver end on receiving the ICMP error message-Time exceeded (S1330). The receiver end receives the reachability probe packet (S1340). The receiver end generates an ICMP error message-Destination Unreachable corresponding to the reachability probe packet (S1350). The receiver end sends the ICMP error message-Destination Unreachable to the sender end (S1360). The sender end receives the ICMP error message-Destination Unreachable (S1370). The sender end determines each transit node reachability by analyzing the ICMP error messages (S1380).

According to embodiments of the present invention, the xcast receivability of receiver end can be tested before sending a large amount of user traffic in the form of xcast packets such that the inefficient use of network resources, which may occur when traffic is sent without test, and the probability of packet loss can be prevented in advance.

Further, the xcast reachability to the receiver end can be tested before sending a large amount of user traffic in the form of xcast packets such that the inefficient use of network resources, which may occur when traffic is sent without test, and the probability of packet loss, which may occur when routing packets, can be prevented in advance.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and rage of equivalency of the claims are embraced within their scope.

What is claimed is:

1. A method of receivability test of explicit multicast of a receiver end, the method comprising:
    at a sender end, generating and sending a receivability probe packet to the receiver end being in data communication with the sender end via a network;
    at the receiver end, receiving the receivability probe packet;
    generating, at the receiver end, an internet control message protocol (ICMP) error message-Destination Unreachable corresponding to the receivability probe packet;
    sending the ICMP error message-Destination Unreachable to the sender end;
    at the sender end, receiving the ICMP error message-Destination Unreachable; and
    at the sender end, determining the explicit multicast receivability by analyzing the ICMP error message-Destination Unreachable,
    wherein the receivability probe packet comprises an IP header, an explicit multicast header, a UDP header and an arbitrary payload,
    wherein the IP header comprises a source address field that is assigned to the sender end, a destination address field that is assigned to the receiver end and a protocol field,
    wherein the explicit multicast header comprises an X bit field, a list of addresses field, a number of destination field and a protocol ID field, and
    wherein the UDP header comprises a source port field and a destination port field.

2. The method as stated in claim 1, wherein the ICMP error message Destination Unreachable is Protocol Unreachable or Port Unreachable.

3. The method as stated in claim 1, further comprising:
    if the ICMP error message-Destination Unreachable is Protocol Unreachable, determining that the receiver end does not have receivability; and
    if the ICMP error message-Destination Unreachable is Port Unreachable, determining that the receiver end has receivability.

4. An apparatus for receivability test of explicit multicast of a receiver end, which is in data communication with a sender end through a network, the apparatus comprising:
    a storage device for storing a program; and
    a processor being coupled to said storage device and performing said program,
    wherein said processor, being operative with said program, is configured to:
        at the sender end, generate and send a receivability probe packet to the receiver end;
        at the receiver end, receive the receivability probe packet;
        generate an internet control message protocol (ICMP) error message-Destination Unreachable corresponding to the receivability probe packet at the receiver end;
        send the ICMP error message-Destination Unreachable to the sender end;
        at the sender end, receive the ICMP error message-Destination Unreachable; and
        at the sender end, determine the explicit multicast receivability by analyzing the ICMP error message-Destination Unreachable,
    wherein the receivability probe packet comprises an IP header, an explicit multicast header, a UDP header and an arbitrary payload, wherein the IP header comprises a source address field that is assigned to the sender end, a destination address field that is assigned to the receiver end and a protocol field, wherein the explicit multicast header comprises an X bit field, a list of addresses field, a number of destination field and a protocol ID field, and wherein the UDP header comprises a source port field and a destination port field.

5. A method of reachability test of explicit multicast of a receiver end, the method comprising:

generating and sending, at a sender end, a reachability probe packet with a time-to-live (TTL) value to the receiver end, being in data communication with the sender end via a network;

sending, at the sender end, a reachability probe packet with a TTL value that is increased by a certain amount on receiving an internet control message protocol (ICMP) error message-Time exceeded;

determining that the receiver end is reachable from the sender end if receiving an ICMP error message-Destination Unreachable at the sender end; and determining that the receiver end is not reachable from the sender end if receiving neither the ICMP error message-Time exceeded within a predetermined time nor the ICMP error message-Destination Unreachable, wherein the reachability probe packet comprises a tunnel IP header, a tunnel explicit multicast header and a receivability probe packet, wherein the tunnel IP header comprises a source address field that is assigned to the sender end, a destination address field that is assigned to the receiver end and a protocol field, and wherein the tunnel explicit multicast header comprises an X bit field, a list of addresses field, a number of destination field and a protocol ID field.

6. The method as stated in claim 5, further comprising repeatedly sending a reachability probe packet with a TTL value that is increased by a certain amount until the ICMP error message-Time exceeded is received from the receiver end.

7. The method as stated in claim 5, wherein the determining that the receiver end is not reachable from the sender end comprises identifying a router that is not capable of the explicit multicasting from the n routers by analyzing a TTL value.

8. An apparatus for reachability test of explicit multicast of a receiver end, which is in data communication with a sender end via a network, the apparatus comprising:

a storage device for storing a program; and a processor being coupled to said storage device and performing said program, wherein said processor, being operative with said program, is configured to:

generate and send a reachability probe packet with a time-to-live (TTL) value to the receiver end;

send a reachability probe packet with a TTL value that is increased by a certain amount on receiving an internet control message protocol (ICMP) error message-Time exceeded;

determine that the receiver end is reachable from the sender end if receiving an ICMP error message-Destination Uureachable at the sender end; and determine that the receiver end is not reachable from the sender end if receiving neither the ICMP error message-Time exceeded within a predetermined time nor the ICMP error message-Destination Unreachable, wherein the reachability probe packet comprises a tunnel IP header, a tunnel explicit multicast header and a receivability probe packet, wherein the tunnel IP header comprises a source address field that is assigned to the sender end, a destination address field that is assigned to the receiver end and a protocol field, and wherein the tunnel explicit multicast header comprises an X bit field, a list of addresses field, a number of destination field and a protocol ID field.

9. The method as stated in claim 5, wherein the network comprises n (n≧1) routers, wherein if the $n^{th}$ router is not capable of the explicit multicasting the $n^{th}$ router discards the reachability probe packet sent by the sender end or the $(n-1)^{th}$ router, and wherein if the $n^{th}$ router is capable of the explicit multicasting the $n^{th}$ router tests the TTL value of the reachability probe packet sent by the sender end or the $(n-1)^{th}$ router, if the TTL value is 0, generates an ICMP error message-Time exceeded to be sent to the sender end; if the TTL value is not exceeded, performs the explicit multicast routing to $(n+1)^{th}$ router or the receiver end.

10. The apparatus as stated in claim 8, wherein the network comprises n (n≧1) routers, wherein if the $n^{th}$ router is not capable of the explicit multicasting the $n^{th}$ router discards the reachability probe packet sent by the sender end or the $(n-1)^{th}$ router, and wherein if the $n^{th}$ router is capable of the explicit multicasting the $n^{th}$ router tests the TTL value of the reachability probe packet sent by the sender end or the $(n-1)^{th}$ router, if the TTL value is 0, generates an ICMP error message-Time exceeded to be sent to the sender end; if the TTL value is not exceeded, performs the explicit multicast routing to $(n+1)^{th}$ router or the receiver end.

11. A method of testing a receiver end as to whether the receiver end can support the processing of an explicit multicast packet, the method comprising:

generating and sending a test packet to the receiver end, wherein the test packet is sent before an explicit multicast packet is transmitted to the receiver end;

receiving a reply packet from the receiver end, wherein the reply packet indicates whether the receiver end can support the processing of an explicit multicast packet; and determining, based on the reply packet, whether the receiver end can support the explicit multicast packet processing, wherein the reachability probe packet comprises a tunnel IP header, a tunnel explicit multicast header and a receivability probe packet, wherein the tunnel IP header comprises a source address field that is assigned to the sender end, a destination address field that is assigned to the receiver end and a protocol field, and wherein the tunnel explicit multicast header comprises an X bit field, a list of addresses field, a number of destination field and a protocol ID field.

12. The method of claim 11, wherein the test packet is a receivability probe packet and the reply packet is an internet control message protocol (ICMP) error message-Destination Unreachable corresponding to the receivability probe packet.

13. The method of claim 12, wherein the ICMP error message is either i) a Protocol Unreachable message indicating that the receiver end does not support the explicit multicast packet processing, or ii) a Port Unreachable message indicating that the receiver end supports the explicit multicast packet processing.

14. An apparatus for testing a receiver end as to whether the receiver end can support the processing of an explicit multicast packet, the apparatus comprising:

means for generating and sending a test packet to the receiver end, wherein the test packet is sent before an explicit multicast packet is transmitted to the receiver end;

means for receiving a reply packet from the receiver end, wherein the reply packet indicates whether the receiver end can support the processing of an explicit multicast packet; and     means for determining, based on the reply packet, whether the receiver end can support the explicit multicast packet processing,     wherein the test packet comprises a tunnel IP header, a tunnel explicit multicast header and a receivability probe packet,     wherein the tunnel IP header comprises a source address field that is assigned to the sender end, a destination address field that is assigned to the receiver end and a protocol field, and     wherein the tunnel explicit multicast header comprises an X bit field, a list of addresses field, a number of destination field and a protocol ID field.

\* \* \* \* \*